United States Patent

Schärer; Paul et al.

Patent Number: 5,464,299
Date of Patent: Nov. 7, 1995

[54] CLAMPING DEVICE

[75] Inventors: Paul Schärer, Münsingen; Kaspar Stöckli, Kiesen, both of Switzerland

[73] Assignee: Usm U. Schärer Söhne Ag., Münsingen, Switzerland

[21] Appl. No.: 162,613

[22] Filed: Dec. 7, 1993

[30] Foreign Application Priority Data

Dec. 15, 1992 [CH] Switzerland ............................ 3828/92

[51] Int. Cl.$^6$ ........................................... F16B 7/04
[52] U.S. Cl. .................... 403/297; 403/409.1; 403/264; 403/2; 403/12
[58] Field of Search ..................... 403/174, 178, 403/171, 170, 217, 260, 245, 246, 297, 264, 292, 11, 12, 409.1, 2; 285/421

[56] References Cited

U.S. PATENT DOCUMENTS

| | | | |
|---|---|---|---|
| 2,198,964 | 4/1940 | Goodyear | 403/12 |
| 3,713,677 | 1/1973 | DuPreez | 403/297 X |
| 3,945,743 | 3/1976 | Koch | 403/290 |
| 4,154,276 | 5/1979 | Wesner | |
| 4,365,907 | 12/1982 | Berry | 403/12 |
| 5,186,570 | 2/1993 | Graf | 403/174 |
| 5,238,343 | 8/1993 | Scherrer | 403/297 X |
| 5,348,210 | 9/1994 | Linzell | 403/11 X |

FOREIGN PATENT DOCUMENTS

| | | |
|---|---|---|
| 0455945 | 11/1991 | European Pat. Off. . |
| 2278981 | 2/1976 | France . |
| 625371 | 2/1936 | Germany . |
| 1264902 | 3/1968 | Germany . |
| 8228118 | 1/1986 | Germany . |
| 429317 | 1/1967 | Switzerland . |
| 488120 | 3/1970 | Switzerland . |
| 1266350 | 3/1972 | United Kingdom . |

*Primary Examiner*—Anthony Knight
*Attorney, Agent, or Firm*—Brady, O'Boyle & Gates

[57] ABSTRACT

A clamping device that can be anchored in a hollow profile member (2) by expansion in force-derived fashion comprises two wedge-like wedge sleeve halves (5.1, 5.2). A surface responsible for the force-derived connection is constituted at least in part by a coating (8.1, 8.2) of granulated hard material.

20 Claims, 1 Drawing Sheet

5,464,299

CLAMPING DEVICE

BACKGROUND OF THE INVENTION

1. Field of the Invention

The invention relates to a clamping device able to be anchored in force-derived fashion in a hollow profile member by expansion. The invention furthermore concerns a releasable coupling arrangement between a tubular hollow profile member and another structural element, as well as a furnishing system.

2. State of the Art

Furnishing systems (framework systems, furniture systems, etc.) composable from structural elements having a hollow profile shape have been widely known and are popular due to the great versatility of usage. The important aspect in such furnishing systems resides in that the connections between the individual elements (for example, between columns and struts) can bear loads and are pleasing from an esthetic viewpoint.

Swiss Patent No. 429,317, Swiss Patent No. 488,120, or EP No. 0 455 945 A1 disclose clamping connections of the type mentioned above. They exhibit each two wedges which are pulled toward each other by means of a screw penetrating the wedges in the longitudinal direction and are consequently pressed against the tubular inner wall of the strut.

It has been found that the ability to bear tensile stress frequently does not attain the desired level in the conventional clamping devices.

SUMMARY OF THE INVENTION

Therefore, it is an object of the invention to indicate a clamping device of the type discussed hereinabove which is distinguished by an improved ability to bear tensile stresses.

According to the invention, this object has been attained by providing that a surface, responsible for the force-derived connection, is constituted at least in part by a coating of hard material granules.

The granulated hard material produces a roughness favoring a frictional connection. The points of the hart material grains embedded in the coating penetrate into the contacting material at the high compressive force required for the force-derived connection, leading to a fine meshing connection.

According to a preferred embodiment, the granulated hard material is granulated quartz. The coating is constituted, for example, by a synthetic resin having quartz granules mixed therein.

Typically, the aforementioned clamping device is utilized in a hollow profile member of steel. The granulated quartz coating is thus pressed onto a steel surface. It has been found that a very good frictional connection can thereby be realized.

According to an especially preferred embodiment, the clamping device comprises two wedge sleeve halves of steel sheet. These can be manufactured with relatively low expense.

It has been found that the wedge angle formed between the wedge sleeves has great significance. If the angle is too large, the wedge sleeve halves do not slide on each other with satisfactory ease. If, in contrast thereto, the angle is too small, then the expansion effect is too insignificant. It has now been found that a wedge angle of about 17° leads to an optimum frictional connection.

According to an advantageous embodiment, the wedge sleeve halves are shaped in one piece from a steel sheet. Each wedge sleeve half is of a U shape in axial cross section and has a fishplate covering the wedge sleeve half (or, respectively, its U-shaped profile member) axially at one end. The fishplate has a bore for a screw and rests on the end face of the U-shaped profile member. The screw serves for spreading the clamping device.

Normally, the wedge sleeve halves are designed as two independent parts. For the purpose of facilitating assembly, the halves are held together preferably by a tearable adhesive film when delivered. The adhesive film is severed during the mounting procedure by the expansion of the clamping device.

The invention is suitable for furniture and framework systems of all kinds. The clamping connection means is inserted, for example, in a strut and threaded to a column. For the mounting procedure to a column, various possibilities exists. A retaining ring arrangement is preferred as known from EP No. 0 455 945 A1 cited hereinabove. The spherical head arrangement according to Swiss Patent No. 429,317 or Swiss Patent No. 488,120 is, of course, likewise suitable.

Further preferred embodiments and feature combinations of the invention can be seen from the detailed description and the entirety of the claims.

BRIEF DESCRIPTION OF THE DRAWINGS

The invention will be described in greater detail below with reference to embodiments and in conjunction with the drawings wherein.

Basically, identical components in the figures bear the same reference symbols.

DESCRIPTION OF THE PREFERRED EMBODIMENT

Figure 1:
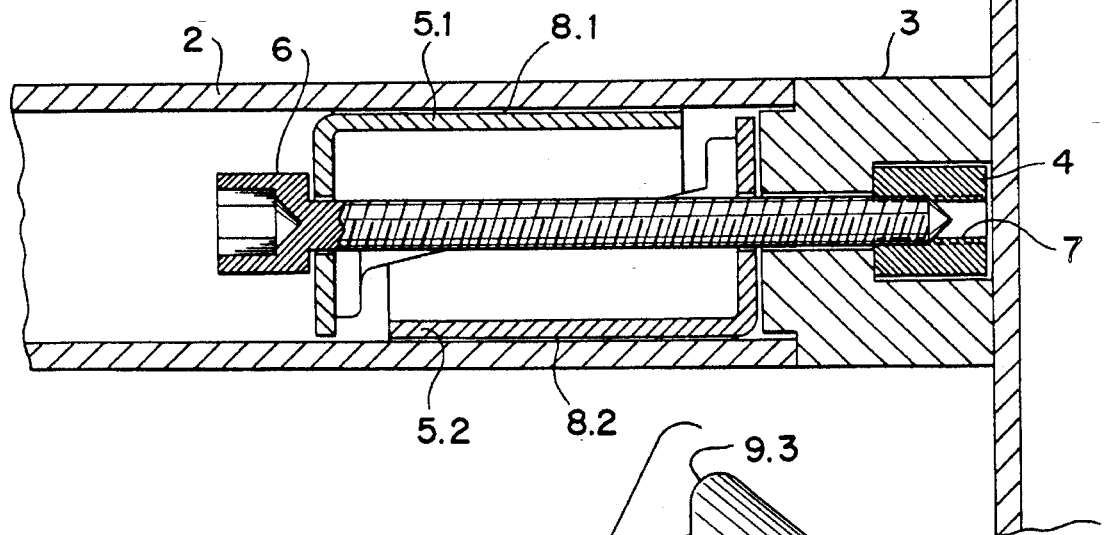
FIG. 1 is a sectional view of a connecting arrangement according to this invention between a column and a strut.

FIG. 1 shows a connecting arrangement according to this invention in a sectional view. A strut 2 having the shape of a hollow profile is attached to a column 1 which is, for example, of a hollow-cylindrical shape, by means of a clamping device according to this invention to be described below, a retaining ring 4, and a transition member 3. The retaining ring 4 encompasses the column 1 and preferably exhibits several threaded bores (denoted by reference numeral 7 in FIG. 1) distributed along the circumference. The transition element 3 extends around the retaining ring 4 in the manner of pliers, and transmits torques of the strut 2 to the retaining ring 4. Furthermore, the transition element establishes an esthetically clean transition between the strut 2 and the column 1.

The principle of retaining ring mounting has been described in detail in EP 0 455 945 A1. Therefore, there is no need to render any more detailed description at this point.

The clamping device of this invention comprises two wedge sleeve halves 5.1, 5.2. The latter are pulled against each other in the axial direction by means of a screw 6 extending in the longitudinal axial direction of the strut 2. Based on their wedge-like character, they are simultaneously urged in the radial direction outwardly against the inner wall of the strut 2. The resultant force-locking connection (between the wedge sleeve and the strut) represents the basic principle of the present connecting arrangement.

According to the invention, this force-derived connection is decisively improved by the feature that the relevant surfaces of the wedge sleeve halves 5.1, 5.2 are provided, at least in certain areas, with a granulated quartz coating 8.1, 8.2. The ability to bear tensile stresses of the connecting arrangement is thereby considerably enhanced.

Figure 2:
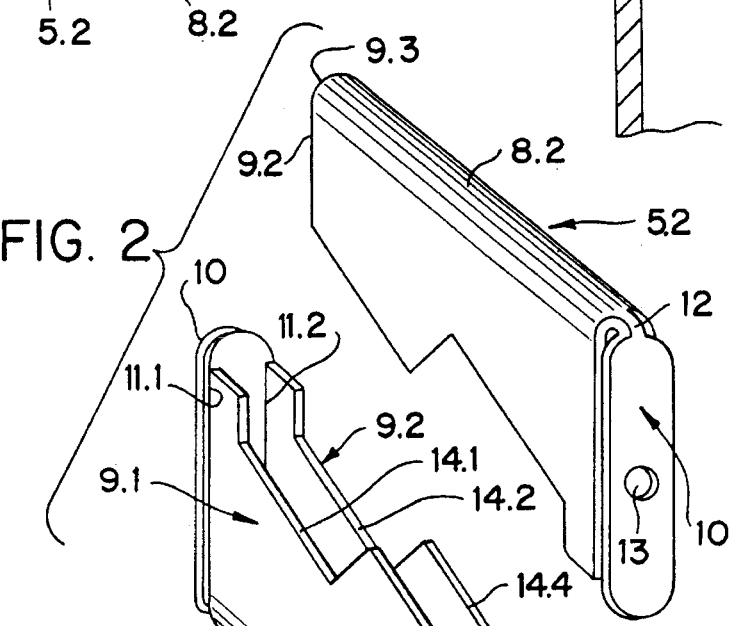
FIG. 2 is a perspective view of a wedge sleeve half according to this invention from two different sides.

FIG. 2 shows the wedge sleeve half 5.2 in a perspective view from two different viewing directions. This half is, so to speak, complementary to itself. In other words, the clamping device exhibits two identical, complementary halves.

Since, in the present example, the strut 2 is designed in the manner of a flattened tube, the wedge sleeve half 5.2 has two more or less planar lateral surfaces 9.1, 9.2 and a rounded back 9.3 joining these surfaces. Thereby, a U-shaped profile member is formed. A flat fishplate 10 rests on the end faces 11.1, 11.2 of the lateral surfaces 9.1, 9.2. This fishplate is somewhat smaller in area than the inner cross section of the strut 2. As can be derived from FIG. 2, the fishplate 10 is in contact with the profile member almost along its entire periphery.

In the wedge sleeve half 5.2 of FIG. 2, it can be seen that the aforementioned fishplate 10 attached at the end face is connected with the U-shaped profile member, especially with its round back 9.3, via a neck 12. The wedge sleeve half 5.2 is thus shaped from a coherent steel sheet piece having a thickness of, for example, 3 to 4 mm.

According to an especially preferred embodiment of the invention, the wedge sleeve half 5.2 is covered on its back 9.3, adapted in its shape to the corresponding inner surface of the strut 2, with a coating 8.2 of granulated hard material. Since the lateral surfaces 9.1, 9.2 substantially do not contribute toward the frictional connection, they have been left uncoated.

The granulated quartz coating involves, for example, a synthetic resin with quartz grains admixed thereto.

The fishplate 10 has a centrally located hole 13. The screw 6 is to be passed through this hole.

The wedge sleeve halves 5.1 and 5.2 rest on each other with the longitudinally lateral narrow sides of the lateral surfaces 9.1, 9.2. The resultant sliding surfaces 14.1, 14.2 extend at an angle of preferably about 17° to the longitudinal axis of the wedge sleeve half 5.2 (compare FIG. 3).

Each lateral surface 9.1 and 9.2, respectively, preferably exhibits two sliding surfaces 14.1, 14.2 and 14.3, 14.4, respectively. The sliding surfaces 14.1 and 14.3, and 14.2 and 14.4, respectively, of a lateral surface 9.1 and 9.2, respectively, are separated from each other by a step, thus avoiding too sharp a taper of the wedge sleeve half 5.2.

Figure 3:
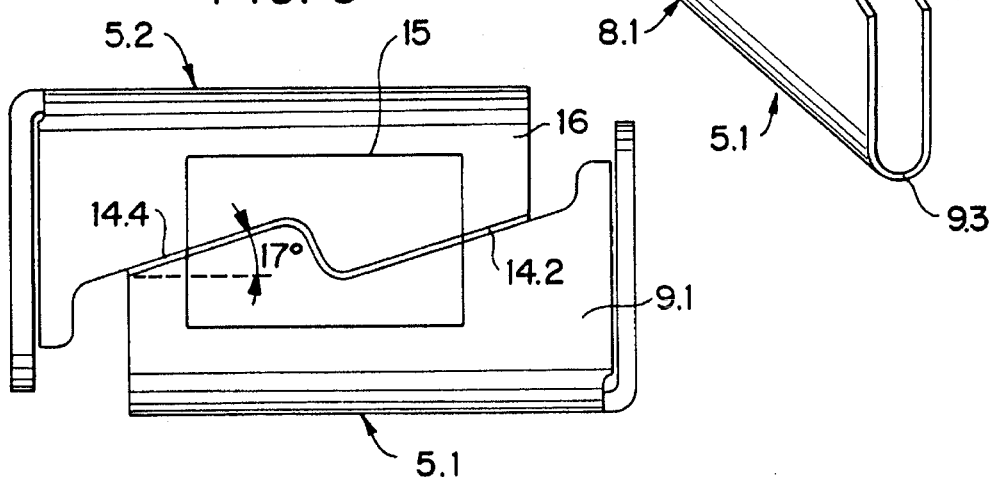
FIG. 3 is a lateral view of two glued-together wedge sleeve halves.

As illustrated in FIG. 3, the wedge sleeve halves 5.1 and 5.2 are joined by means of adhesive films applied to the lateral surfaces, in order to facilitate assembly. In FIG. 3, an adhesive film 15 is applied to the lateral surfaces 9.1 and 16. (The rear lateral surfaces, not apparent in the figure, are of course likewise joined by means of a corresponding adhesive film.) The adhesive film 15 is preferably transparent.

Assembly takes place as follows: The screw 6 is introduced into the mated wedge sleeve halves 5.1 and 5.2. Furthermore, the screw is threaded through the transition element 3 into the threaded bore 7 of the retaining ring 4. The strut 2 is then pushed over the wedge sleeve halves 5.1, 5.2. During the subsequent tightening of the screw 6, the wedge sleeve halves 5.1, 5.2 are shifted with respect to each other along the sliding surfaces; the adhesive films tear apart. By further tightening of the screw 6, the clamping device of this invention is expanded, leading to anchoring of the device in the end of the strut 2.

It can readily be understood that the adhesive film facilitates handling of the wedge sleeves considerably.

The wedge sleeve halves of this invention can be manufactured as follows: A shaped piece having the desired dimension is punched out from a suitable steel sheet. This is preferably accomplished by fine punching. This conventional technique results in a clean configuration of the sliding surfaces. Any expensive finishing of the edges of the punched component is extensively eliminated.

Thereafter, the shaped part is embossed. In other words, the back 9.3 is curved so that the lateral surfaces 9.1, 9.2 come to lie in parallel to each other. The fishplate 10 is folded against the end faces of the lateral surfaces 9.1, 9.2.

Now the back 9.3 is provided with the coating of quartz granules. For delivery, two wedge sleeve halves 5.1, 5.2 are coupled by means of adhesive films.

In summation, it can be stated that the invention has created an optimized clamping device for furnishing systems of all kinds.

We claim:

1. A clamping device for anchoring in a hollow profile member by expansion in a force-derived connection, comprising
   a) two wedge sleeve halves,
   b) a surface for producing the force-derived connection on said wedge sleeve halves,
   c) a coating of hard material granules formed at least on a part of said surface,
   d) said wedge sleeve halves each being shaped in one piece from a steel sheet,
   e) each wedge sleeve half being U-shaped and including a bight portion,
   f) said surface being on said bight portion, and
   g) a fishplate axially covering each U-shaped wedge sleeve half at one end thereof.

2. A clamping device according to claim 1, in which said coating of hard material granules is a granulated quartz coating.

3. A clamping device according to claim 1, in which said wedge sleeve halves form a wedge angle of about 17° relative to each other.

4. A clamping device according to claim 1, in which said one end of each wedge sleeve half is U-shaped, said fishplate of each wedge sleeve half includes a hole for receiving a screw, said fishplate having long peripheral portions and short peripheral portions, and said fishplate overlapping and supported along said long peripheral portions by said U-shaped end of said U-shaped wedge sleeve half.

5. A clamping device according to claim 1, in which said wedge sleeve halves are two separate parts, and at least one tearable adhesive film connecting said two separate parts together as a unit for facilitating the assembly of said wedge sleeve halves as a unit in a hollow profile member.

6. A clamping device for anchoring in a hollow profile member by expansion in a force-derived connection, comprising
   a) two wedge sleeve halves,
   b) a surface on said wedge sleeve halves for producing the force-derived connection, c) a coating of hard material granules formed at least on a part of said surface, d) said wedge sleeve halves each being shaped in one piece from a steel sheet, e) each wedge sleeve half being U-shaped and including a bight portion, f) said surface being on said bight portion, g) a respective fishplate axially covering each U-shaped wedge sleeve half at one end thereof, h) each fishplate having a pair of long peripheral portions corresponding to the leg portions at the one end of the U-shaped wedge sleeve half, and having a hole therethrough for a screw, and i) said pair of long peripheral portions of each fishplate supported by the leg portions of said end face of said U-shaped wedge sleeve half.

7. A clamping device according to claim 6, in which said coating of hard material granules is a granulated quartz coating.

8. A clamping device according to claim 6, in which said wedge sleeve halves form a wedge angle of about 17° relative to each other.

9. A clamping device for anchoring in a hollow profile member by expansion in a force-derived connection, comprising a pair of wedge sleeve halves being formed as two separate parts, and at least one tearable adhesive film connecting said pair of wedge sleeve halves together as a unit for enabling the assembly of said pair of wedge sleeve halves as a unit into a hollow profile member.

10. A clamping device according to claim 9, including a surface on each of said wedge sleeve halves for producing the force-derived connection, and a coating of hard material granules formed at least on a part of said surface.

11. A clamping device according to claim 10, in which said coating of hard material granules is a granulated quartz coating.

12. A clamping device according to claim 9, in which said pair of wedge sleeve halves are constructed of steel sheet.

13. A clamping device according to claim 9, in which said pair of wedge sleeve halves form a wedge angle of about 17° relative to each other.

14. A clamping device according to claim 9, in which said pair of wedge sleeve halves are shaped in one piece from a steel sheet, each wedge sleeve half being U-shaped and having an outer end, and a fishplate axially covering the outer end of each of said U-shaped wedge sleeve halves.

15. A clamping device according to claim 14, in which the outer end of each wedge sleeve half is U-shaped, said fishplate of each wedge sleeve half includes a hole for receiving a screw, said fishplate having long peripheral portions and short peripheral portions, and said fishplate overlapping and supported along said long peripheral portions by said U-shaped end of said U-shaped wedge sleeve half.

16. A clamping device for anchoring in a hollow profile member by expansion in a force-derived connection, comprising a) two wedge sleeve halves, b) a surface for producing the force-derived connection on each of said wedge sleeve halves, c) a coating of hard material granules formed at least on a part of said surface, d) said wedge sleeve halves each being shaped in one piece from a steel sheet, and e) said two wedge sleeve halves forming a wedge angle of about 17° relative to each other.

17. A clamping device according to claim 16, in which said coating of hard material granules is a granulated quartz coating.

18. A clamping device according to claim 16, in which said wedge sleeve halves are each shaped in one piece from a steel sheet, each wedge sleeve half being U-shaped and having an outer end, and a fishplate axially covering the outer end of each of said U-shaped wedge sleeve halves.

19. A clamping device according to claim 18, in which the outer end of each wedge sleeve half is U-shaped, said fishplate of each wedge sleeve half includes a hole for receiving a screw, said fishplate having long peripheral portions and short peripheral portions, and said fishplate overlapping and supported along said long peripheral portions by said U-shaped end of said U-shaped wedge sleeve half.

20. A clamping device according to claim 16, in which said wedge sleeve halves are two separate parts, and at least one tearable adhesive film connecting said two wedge sleeve halves together as a unit for enabling the assembly of said two wedge sleeve halves as a unit into a hollow profile member.

\* \* \* \* \*